United States Patent [19]

Lorenz

[11] 4,389,148
[45] Jun. 21, 1983

[54] APPARATUS FOR BUNDLING ELONGATED WORKPIECES

[75] Inventor: Horst Lorenz, Solingen, Fed. Rep. of Germany

[73] Assignee: Th. Kieserling & Albrecht, GmbH & Co. KG, Solingen, Fed. Rep. of Germany

[21] Appl. No.: 157,974

[22] Filed: Jun. 9, 1980

Related U.S. Application Data

[63] Continuation of Ser. No. 895,358, Apr. 11, 1978, abandoned.

[30] Foreign Application Priority Data

Apr. 13, 1977 [DE] Fed. Rep. of Germany ....... 2716215

[51] Int. Cl.³ .............................................. B65G 57/10
[52] U.S. Cl. ...................................... 414/85; 198/740; 414/89; 414/748
[58] Field of Search ....................... 414/30, 56, 82, 85, 414/89, 900, 745, 748; 198/740

[56] References Cited

U.S. PATENT DOCUMENTS

| | | | |
|---|---|---|---|
| 2,895,624 | 7/1959 | Oster | 414/82 X |
| 3,157,294 | 11/1964 | Bolt | 414/85 |
| 3,202,115 | 8/1965 | Jones | 198/740 X |
| 3,627,151 | 12/1971 | Campbell | 414/86 |
| 3,735,880 | 5/1973 | Hill et al. | 414/85 X |

FOREIGN PATENT DOCUMENTS

| | | | |
|---|---|---|---|
| 1144648 | 2/1963 | Fed. Rep. of Germany | 414/82 |
| 2401174 | 7/1975 | Fed. Rep. of Germany | |
| 2401175 | 7/1975 | Fed. Rep. of Germany | 414/68 |
| 382565 | 8/1973 | U.S.S.R. | |

*Primary Examiner*—Leslie J. Paperner
*Attorney, Agent, or Firm*—Edward E. Sachs

[57] ABSTRACT

Apparatus for bundling elongated workpieces includes a generally U-shaped trough having a vertically movable bottom wall for adjusting the depth of the trough. A horizontally and vertically movable pusher feeds the workpieces transversely of their length toward the trough for positioning a plurality of the workpieces in side-by-side relationship to form a horizontal row. Horizontally movable support rails are movable selectively between a position extending across the trough spaced above its movable bottom wall wherein a new row of workpieces is positioned on the rails, and a position displaced from the trough for allowing the new row of workpieces to glide in stacking relationship on a previous row of workpieces resting on the movable bottom wall. A slope structure is inclined downwardly toward the pusher. A movable stop is positioned adjacent the lower end of the slope structure, and is movable between a stopping position for stopping workpieces moving down the slope toward the trough and a retracted position for allowing movement of workpieces therepast into the trough by operation of the pusher.

8 Claims, 4 Drawing Figures

APPARATUS FOR BUNDLING ELONGATED WORKPIECES

This is a continuation of application Ser. No. 895,358, filed Apr. 11, 1978, now abandoned.

The invention relates generally to bundling and stacking apparatus and, more particularly, to such apparatus for bundling elongated workpieces in the form of cylindrical rods or pipes.

In the manufacture of elongated workpieces, such as rods or pipes, the workpieces move longitudinally onto a roller table. The workpieces are then moved from the roller table in a direction transversely of the workpiece length for positioning in a generally U-shaped trough having a vertically movable bottom wall for adjusting the depth of the trough. Horizontally movable rails extend across the trough above its movable bottom wall for receiving a new horizontal row of side-by-side workpieces. The rails are retractable from across the trough for lowering the new row of workpieces onto the previous row resting on the trough bottom wall. When a plurality of vertically stacked horizontal rows of workpieces are positioned in the trough, chains or other wrapping devices are wrapped around the workpieces to form a bundle. A crane or other lifting device then lifts the bundle out of the trough.

In apparatus of the type described, the noise produced by movement of the workpieces into the trough is above the pain threshold of human hearing. In order to attenuate the noise, it is known to move the workpieces from the roller table at a controlled velocity by the use of a lifting mechanism which moves at right angles to the workpiece length and transports same in one movement into the trough. A lifting mechanism of this type is not capable of high speed operation and cannot keep up with the apparatus which manufactures the workpieces or otherwise performs work thereon and feeds same one after another at a high axial velocity onto the roller table. Therefore, the output of the manufacturing apparatus must be reduced to allow proper operation of the lifting mechanism for moving the workpieces into the vicinity of the trough. Thus, there is a conflict between the high speed manufacturing apparatus and the relatively low speed lifting mechanism for transferring the workpieces into the vicinity of the trough. This is primarily due to the fact that the same device which lifts the workpieces from the roller table also moves them into the trough. In addition, apparatus of this type cannot be fitted to existing equipment because the lifting mechanism operates in the vicinity of the roller table. A lifting mechanism of the type described is also unsuitable for use with mechanisms wherein the workpieces arrive at a high velocity in a direction at right angles to their longitudinal axes.

It is therefore the primary object of the present invention to provide an improved apparatus for bundling elongated workpieces in a manner which minimizes noise.

It is an additional object of the invention to provide such an apparatus which is capable of operating regardless of the speed of the manufacturing apparatus which delivers the workpieces to a roller table.

It is a further object of the invention to provide an economical and relatively simple apparatus for bundling elongated workpieces in a very efficient manner.

An aspect of the invention resides in positioning a downwardly inclined slope structure between the workpiece roller table and the trough. A lifting device displaces the elongated workpieces from the roller table in a direction at right angles to the workpiece length for movement of the workpieces down the slope structure. A movable stop adjacent the lower end of the slope structure is movable between a stopping position for stopping the workpieces and a retracted position for allowing movement of the workpieces therepast toward the trough. A horizontally and vertically movable pusher feeds the workpieces transversely toward the trough for positioning a plurality of the workpieces in side-by-side relationship to form a horizontal row.

In a preferred arrangement, the pusher and stop are defined by a common member having one side forming the stop and an opposite side forming the pusher. The opposite side of the member forming the pusher preferably forms the upper sidewall of the trough on one side.

In accordance with a further aspect of the present invention, the apparatus includes a generally U-shaped trough having a vertically movable bottom wall for adjusting the depth of such trough; a movable pusher for transversely feeding workpieces towards the trough for positioning a plurality of workpieces in side-by-side relationship to form a row; a slope structure downwardly inclined toward the pusher; horizontally movable support rails which are selectively movable between a position extending across the trough spaced above the movable bottom wherein a new row of workpieces is then positionable on the rail in a position displaced from the trough and beneath the slope structure for stacking the new row of workpieces onto the row of workpieces resting on the movable bottom wall; a movable stop which is adjacent to the lower end of the slope structure and movable between a stopping position for engaging individual workpieces, one at a time, moving down the slope towards the trough and a retracted position (i.e. out of the path of the workpiece) allowing the movement of workpieces therebeyond into the trough by means of the pusher. The pusher and the stop are defined by a common member which has one side forming the stop for engaging the workpiece along its axis of elongation and being placed, i.e. facing, opposite to the direction of movement, of the workpiece, on the slope structure, and the opposite side of the common member forms the pusher for engaging and moving the workpiece about its axis of elongation in the same direction as the workpiece moved on the slope structure; and a side wall surface on the trough movably mounted for being raised and lowered into and out of the path of the workpiece adjacent to the terminal end of the inclined slope structure; and, finally, a movable arrangement which is effective to establish relative movement between the rails and the aforementioned common member.

In accordance with another aspect of the apparatus, the trough has trough sidewalls, and at least one of such sidewalls is adjustable toward and away from the other for adjusting the width of the trough to closely accommodate a plurality of horizontal workpieces in a row. The adjustable trough sidewall is preferably on the opposite side of the trough from the downwardly inclined slope structure.

The side of the projection member which forms the stop surface is preferably lined with a resilient material for absorbing impact and deadening sound.

The projection member forming the stop and pusher may be in the form of an upwardly extending projection on a lever pivotally connected to a slide for pivotal swinging movement to raise and lower the projection. The slide is horizontally movable toward and away from the trough, and these movements allow movement of the projection from one side of the workpiece to the other therebeneath.

In another arrangement, the projection having the stop surface and a pusher surface is rotatably mounted on a shaft extending parallel to the trough above the lower end of the slope structure. Rotation of the shaft and projection causes movement of the stop surface away from a workpiece for engagement of the pusher surface with the opposite side of the workpiece.

For a better understanding of the present invention, together with other and further objects thereof, reference is had to the following description taken in connection with the accompanying drawings, and its scope will be pointed out in the appended claims.

Figure 3:
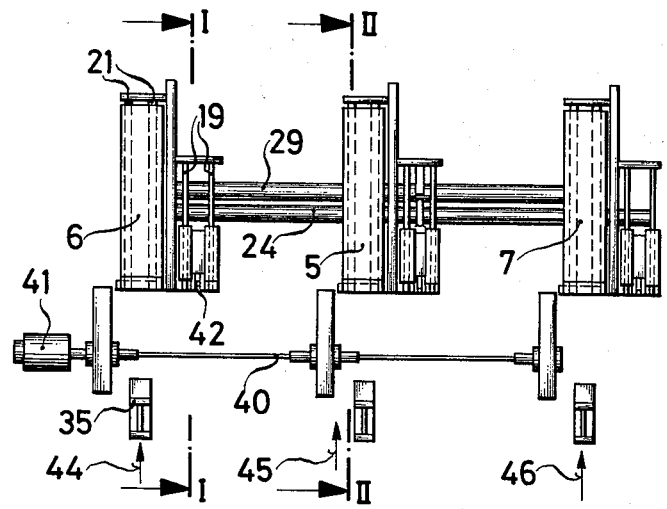
FIG. 3 is a top plan view of the apparatus constructed in accordance with the present application.

Referring now to the drawing, and particularly FIG. 3, there is shown a plurality of component groups 44, 45 and 46 spaced along the longitudinal length of elongated workpieces to be bundled. The operating components for the individual groups are centrally controlled by shafts 24, 29 and 40 extending along the entire length of the apparatus. The shaft 40 is rotatably driven by a reversible motor 41, and each component group 44, 45 and 46 is substantially identical.

Figure 1:
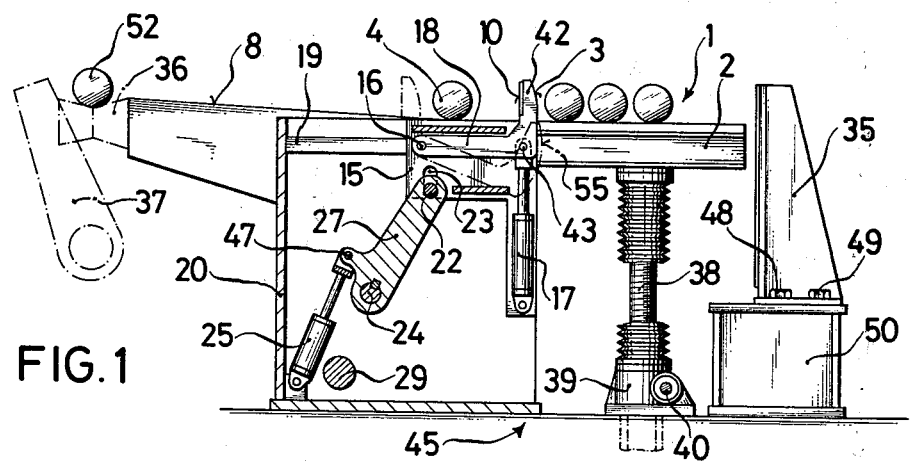
FIG. 1 is a partial cross-sectional elevational view taken generally on line I—I in FIG. 3.
Figure 2:
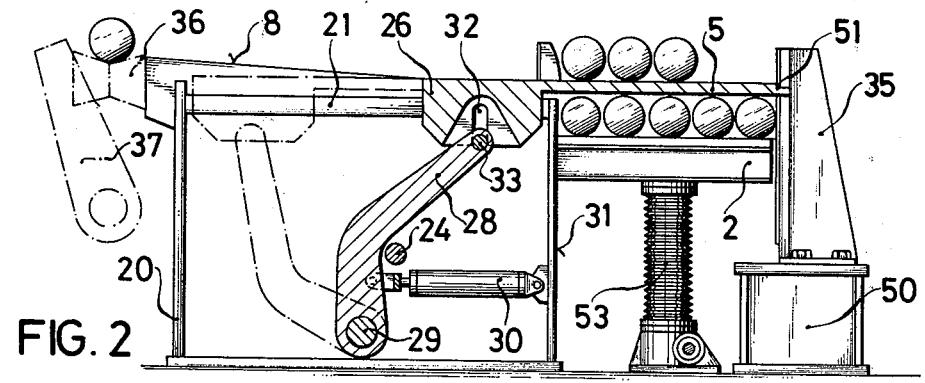
FIG. 2 is a partial cross-sectional elevational view taken generally on line II—II of FIG. 3.

As best shown in FIGS. 1 and 2, the apparatus for bundling round metal bars or pipes includes an upwardly open generally U-shaped trough 1 having a vertically movable bottom wall 2 for adjusting the depth of the trough 1. A horizontally and vertically movable pusher 3 is provided for moving a workpiece 4 at right angles to its length into the trough 1. A downwardly inclined slope structure 8 is inclined downwardly from a roller table 36 toward the trough 1.

A carriage 26 is positioned below the slope structure 8 and is slidable on rails 21. Movement of the carriage 26 is controlled by a lever 28 having an upper end carrying a transverse pin 33 engaged through a vertically elongated hole 32 on the underside of the carriage 26. In the position shown in FIG. 2, horizontal support rails 5 project from the carriage 26 in a position spaced vertically above the movable bottom wall 2, and spaced below the top edges of the trough sides. The slope structure 8 and the rails 21 are of such a length that the rails 5 and the carriage 26 can be moved completely under the slope structure 8 to leave the top of the trough completely open. Thus, the rails 5 are movable between a position extending completely across the trough and a retracted position completely free of the trough beneath the slope structure 8.

Positioned beneath the downwardly inclined slope structure 8 is a toggle lever 18 having one arm extending horizontally and hingedly connected at its free end to a slide 15 by a pin 16. The other arm 42 of the toggle lever 18 defines an upwardly extending projection which projects upwardly from the slide 15 into the path of travel of a workpiece 4 between the lower end of the slope structure 8 and the trough 1. In the normal position shown in FIG. 1, the projection member 42 is arranged on a level extending above the slope structure 8, and with one side aligned with vertical trough sidewall 31 and the opposite side having a stop surface 10, which includes a layer of resilient impact absorbing and sound deadening material, facing toward the roller table 36. Thus, in the position of FIG. 1, the projection member 42 forms one side of the trough 1 at the upper portion thereof. One side 3 of the projection member 42 defines a pusher surface, while the opposite side 10 defines a stop surface. A hydraulic cylinder 17 holds the toggle lever 18 in the position shown in FIG. 1 and may be actuated to pivot the toggle lever 18 clockwise about the pin 16 to lower the projection member 42 below the level of the lower end portion of the slope structure 8, as shown in dotted lines by numeral 55 in FIG. 1.

The slide 15 is connected to a pivotable lever 27 mounted at its lower end to a rotatable shaft 24 secured in the apparatus housing 20 and at its upper end to a shaft 22 secured in a vertically extending slot 23 provided in slide 15. When the cylinder 25 is actuated, both the shaft 24, and the lever 27 connected thereto, are pivoted to cause the slide 15 to move horizontally on guides 19.

The vertically adjustable trough bottom wall 2 is adjusted to a desired position by operation of a lifting element 53 in the form of a threaded element 38 attached to the trough bottom wall 2, and moves in raising and lowering directions by rotation of a worm gear 39 driven by a shaft 40. Adjustable movement of the trough bottom wall 2 adjusts the depth of the trough 1.

Trough sidewall 35 remote from the projection member 42 and the slope structure 8 is adapted to move horizontally for adjusting the width of the trough 1. Therefore, the trough sidewall 35 is attached to a base 50 by bolts 48, 49 which may be loosened for adjusting the horizontal position of the sidewall 35, and then be tightened. The trough sidewall 35 is adjusted to provide a trough width between the sidewall 35 and the sidewall 31 which is a whole multiple of the diameter of the cylindrical workpieces to be bundled. This arrangement insures that workpieces are stacked in distinguishable layers. The workpieces are stacked at all times over the whole width of the trough across the support rails 5. Therefore, when the rails 5 are retracted, the workpieces glide down a very small distance onto the previous row of workpieces resting upon the bottom wall 2. The rails 5 have flattened tops 51 so a new row of workpieces is lowered a very small distance when the rails 5 are withdrawn.

Figure 4:
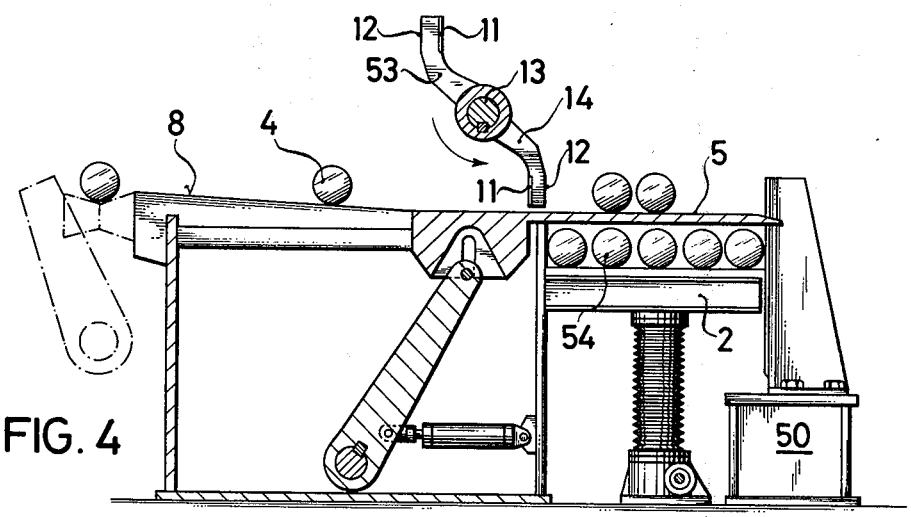
FIG. 4 is a partial cross-sectional elevational view similar to FIG. 1, and showing another embodiment of the invention.

The embodiment of FIG. 4 includes a pusher surface 12 and a stop surface 11 on a generally S-shaped arm 14 and 53 secured to a rotatable shaft 13. An incoming workpiece 4 rolls up to the stop surface 11 which carries a layer of resilient impact absorbing and sound deadening material facing toward the slope structure 8. The shaft 13 is resiliently rotatable so that the stop surface 11 may stop a workpiece resiliently by providing some yielding movement. As soon as a workpiece 4 comes to rest against the surface 11, the workpiece is moved forward onto the rails 5 by arm 53 which is lowered by the counterclockwise rotation of the shaft 13. In this position the rails 5 form an upper wall of the trough. At the same time, upward movement of the arm 14 causes its flat surface 12 to move out of its vertical position forming one side of the trough sidewall upper portion, and shifts the previous workpiece to a position in the trough directly above the workpiece 54. The workpieces are progressively shifted to the right in the trough to make room for the succeeding workpiece.

The embodiment of FIG. 4 is intended mainly for short and light workpieces because the shaft 13 can be supported only at its ends, and must remain unsupported over the entire length of the bundling apparatus for allowing transverse movement of the workpieces therepast. All movement of the apparatus may be fully automated by suitable controls, including, but not necessarily limited to, photoelectric cells, counting devices, limit switches and the like.

In operation of the apparatus, elongated cylindrical rods or pipes move longitudinally one after another onto the roller table 36. As the workpieces arrive on the roller table 36, they are lifted or displaced transversely therefrom onto the downwardly inclined slope structure 8 by means of lifting device 37 for movement downwardly toward the stop surface 10 on the projection member 42. Engagement of the workpiece 4 with the stop surface 10 absorbs resiliently the impact of the workpiece, and the resilient material deadens the sound. The vertical distance between the center of the workpiece 4 and the pin 16 connecting the toggle lever 18 to the slide 15 causes a torque on the lever 18 for moving same clockwise and in the direction of workpiece travel against the force of cylinder 17. A workpiece stopped in this manner comes to rest adjacent the lower end of the slope structure 8. Operation of the hydraulic cylinder 17 then pivots the toggle lever 18 clockwise to lower the outer end of the projection member 42 below the workpiece 4. Displacement of the slide 15 away from the trough 1 by operation of the hydraulic cylinder 25 then moves the projection member 42 to the opposite side of the workpiece 4. Operation of the cylinder 17 again raises the projection member 42 above the lower end of the slope structure 8 on the opposite side of the workpiece 4. Operation of the cylinder 25 and rotation of the lever 27 then moves the slide 15 toward the trough 1 so the pusher surface 3 on the projection member 42 moves the workpiece onto the trough bottom wall 2 or onto the rails 5. Any workpieces already on the bottom wall or rails move horizontally toward the trough sidewall 35. The described sequence of movement takes place relatively slowly so that the resulting noise does not reach the pain threshold of human hearing.

Once a horizontal row of side-by-side workpieces are positioned on the trough bottom wall 2, the bottom wall is moved downwardly and the rails 5 are extended across the trough for positioning another horizontal row of workpieces thereon. After a new row of workpieces is positioned on the rails 5, the rails are slowly drawn under the slope structure 8 by operation of the hydraulic cylinder 30 for swinging the lever 28 and shifting the carriage 26 on rails 21 beneath the slope structure 8. This moves the rails 5 completely beneath the slope structure 8 to a displaced position free of the trough 1 so the new row of workpieces drops slightly onto the previous row. As each new horizontal row of workpieces is stacked, the trough bottom wall is lowered by a distance generally corresponding to one workpiece diameter until the movable wall 2 is approximately at a level with the platform 50. Chains or other wrapping elements are then extended around the stacked workpieces to form a bundle, and the bundle is lifted out of the trough by a crane or other lifting device.

In the arrangement of FIGS. 1 and 2, the trough 1 is easily accessible to an operator because there are no exposed shafts along the apparatus or trough to impede access. The moving parts are also concealed beneath the slope structure 8 where the operator is unlikely to make contact with them.

While there have been described what are at present considered to be the preferred embodiments of this invention, it will be obvious to those skilled in the art that various changes and modifications may be made therein without departing from the invention, and it is aimed, therefore, in the appended claims to cover all such changes and modifications as fall within the true spirit and scope of the invention.

What is claimed is:

1. Apparatus for bundling elongated metallic workpieces such as metal rods and bars comprising: a generally U-shaped trough having a vertically movable bottom wall for adjusting the depth of such trough, a horizontally and vertically movable pusher for transversely feeding workpieces toward such trough for positioning a plurality of workpieces in side-by-side relationship to form a row, a slope structure downwardly inclined toward such pusher, horizontally movable support rails selectively movable between a position extending across said trough spaced above said movable bottom wherein a new row of workpieces is positionable on said rails in a position displaced from said trough and beneath said slope structure for stacking the new row of workpieces onto the row of workpieces resting on said movable bottom wall, a movable stop adjacent the lower end of said slope structure movable between a stopping position for stopping workpieces moving down said slope toward such trough and a retracted position allowing movement of workpieces therebeyond into said trough by means of said pusher; wherein said pusher and stop are defined by a common member having one side forming said stop and an opposite side forming said pusher and a sidewall surface for said trough, and said common member being pivotably mounted about a single axis for raising and lowering out of the path of the workpiece; and movable support means in engagement with said common member to move said member including its axis of rotation along a predetermined path.

2. The apparatus of claim 1 wherein said trough has spaced trough sidewalls and at least one of said trough sidewalls is adjustable toward and away from the other said sidewall for adjusting the width of said trough.

3. The apparatus of claim 2 wherein said adjustable trough sidewall is on the side of said trough remote from said slope structure.

4. The apparatus of claim 1 wherein said stop surface is covered with resilient material for absorbing impact and deadening sound.

5. Apparatus for bundling elongated metallic workpieces such as metal rods and bars comprising: a generally U-shaped trough having a vertically movable bottom wall for adjusting the depth of such trough, a movable pusher for transversely feeding workpieces toward such trough for positioning a plurality of workpieces in side-by-side relationship to form a row, a slope structure downwardly inclined toward such pusher, horizontally movable support rails selectively movable between a position extending across said trough spaced above said movable bottom wherein a new row of workpieces is positionable on said rails in a position displaced from said trough and beneath said slope structure for stacking the new row of workpieces onto the row of workpieces for resting on said movable bottom wall, a movable stop adjacent the lower end of said slope structure movable between a stopping position for engaging individual workpieces one at a time moving down the slope towards such trough and a retracted position allowing movement of workpieces therebeyond into said trough by means of said pusher; wherein said pusher and stop are defined by a common member having one side forming said stop for engaging the workpiece along its axis of elongation opposite to the direction of movement of the workpieces on the slope structure and an opposite side of the common member forming said pusher for engaging and moving the workpiece about its axis of elongation in the same direction as the workpiece moves on the slope structure and a side wall surface for said trough and movably mounted for being raised and lowered into and out of the path of the workpiece adjacent to the terminal end of the inclined slope structure; and movable means effective to establish relative movement between said rails and said common member.

6. Apparatus according to claim 5, wherein said common member is moved vertically into and out of said path.

7. Apparatus according to claim 6, wherein said common member is mounted about a pivot.

8. Apparatus according to claim 6, wherein said common member is mounted for horizontal movement.

* * * * *